(12) United States Patent
Iwasaki et al.

(10) Patent No.: US 11,289,963 B2
(45) Date of Patent: Mar. 29, 2022

(54) ROTOR, MOTOR, AND ELECTRIC POWER STEERING DEVICE

(71) Applicant: Nidec Corporation, Kyoto (JP)

(72) Inventors: Shuji Iwasaki, Kyoto (JP); Takahiro Uetani, Kyoto (JP); Masaaki Ogawa, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 123 days.

(21) Appl. No.: 16/636,381

(22) PCT Filed: Jul. 27, 2018

(86) PCT No.: PCT/JP2018/028246
§ 371 (c)(1),
(2) Date: Feb. 4, 2020

(87) PCT Pub. No.: WO2019/044311
PCT Pub. Date: Mar. 7, 2019

(65) Prior Publication Data
US 2020/0177040 A1 Jun. 4, 2020

(30) Foreign Application Priority Data
Aug. 30, 2017 (JP) .............................. JP2017-165307

(51) Int. Cl.
*H02K 1/28* (2006.01)
*H02K 1/27* (2006.01)
(Continued)

(52) U.S. Cl.
CPC ............. *H02K 1/28* (2013.01); *B62D 5/0409* (2013.01); *H02K 1/276* (2013.01); *H02K 5/24* (2013.01);
(Continued)

(58) Field of Classification Search
CPC .... H02K 1/28; H02K 1/276; H02K 5/24; H02K 2201/06; H02K 2201/09; B62D 5/0409; B62D 5/0403
See application file for complete search history.

(56) References Cited

U.S. PATENT DOCUMENTS

| 9,300,176 | B2 * | 3/2016 | Saito ...................... H02K 1/276 |
| 2011/0050022 | A1 | 3/2011 | Li et al. |
| 2011/0127859 | A1 * | 6/2011 | Amrhein ................ H02K 1/276 |
| | | | 310/43 |

FOREIGN PATENT DOCUMENTS

| CN | 101669266 A | 3/2010 |
| JP | 2002369424 A * | 12/2002 |

(Continued)

OTHER PUBLICATIONS

Machine Translation, KOJIMA, JP-2002369424-A, Dec. 2002. (Year: 2002).*

(Continued)

*Primary Examiner* — Thomas Truong
(74) *Attorney, Agent, or Firm* — Keating & Bennett, LLP

(57) ABSTRACT

A rotor includes a shaft, a rotor core, at least one magnet, and at least one fixing portion. The shaft extends in an axial direction. The rotor core includes laminations, and at least one caulking portion. The laminations are stacked in the axial direction. The at least one caulking portion is located at a radial-directional inner side of the at least one magnet to caulk the laminations to each other. The at least one magnet is embedded in the rotor core. The at least one fixing portion fixes at least portions of outer peripheral edges of the laminations to each other.

11 Claims, 5 Drawing Sheets

(51) Int. Cl.
*B62D 5/04* (2006.01)
*H02K 1/276* (2022.01)
*H02K 5/24* (2006.01)

(52) U.S. Cl.
CPC ..... *H02K 2201/06* (2013.01); *H02K 2201/09* (2013.01)

(56) References Cited

FOREIGN PATENT DOCUMENTS

| | | |
|---|---|---|
| JP | 2007-181254 A | 7/2007 |
| JP | 2015-202027 A | 11/2015 |
| WO | 2014/208582 A1 | 12/2014 |

OTHER PUBLICATIONS

Official Communication issued in International Patent Application No. PCT/JP2018/028246, dated Oct. 16, 2018.
Official Communication issued in corresponding Chinese Patent Application No. 201880052337.3, dated Jul. 5, 2021.

\* cited by examiner

ROTOR, MOTOR, AND ELECTRIC POWER STEERING DEVICE

CROSS REFERENCE TO RELATED APPLICATIONS

This is a U.S. national stage of PCT Application No. PCT/JP2018/028246, filed on Jul. 27, 2018, and priority under 35 U.S.C. § 119(a) and 35 U.S.C. § 365(b) is claimed from Japanese Application No. 2017-165307, filed Aug. 30, 2017; the entire disclosures of each application are hereby incorporated herein by reference.

1. FIELD OF THE INVENTION

The present disclosure relates to a rotor, a motor, and an electric power steering device.

2. BACKGROUND

Conventionally, an IPM rotor in which a magnet is accommodated in a rotor core has been known. For example, a permanent magnet embedded type electric motor is known. A rotor of this electric motor has a rotor core and a permanent magnet. The rotor core has a plurality of steel plates stacked in an axial direction. The rotor core has a magnet embedding hole penetrating the rotor core in the axial direction. The permanent magnet is accommodated in the magnet embedding hole. The plurality of steel plates are fastened to each other by a caulking pin on a radial-directional inner side of the permanent magnet.

When the electric motor configured as described above is rotated, there is a concern that an outer circumferential end of each lamination is opened in an axial direction due to resonance of each lamination.

SUMMARY

A rotor according to an example embodiment of the present disclosure includes a shaft, a rotor core, at least one magnet, and at least one fixing portion. The shaft extends in an axial direction. The rotor core includes a plurality of laminations, and at least one caulking portion. The plurality of laminations are stacked in the axial direction. The at least one caulking portion is disposed at a radial-directional inner side of the at least one magnet and caulks the plurality of laminations to each other. The at least one magnet is embedded in the rotor core. The at least one fixing portion fixes at least portions of outer peripheral edges of the plurality of laminations to each other.

A motor according to an example embodiment of the present disclosure includes the above-described rotor, and a stator facing the rotor in the radial direction and including a plurality of coils.

An electric power steering device according to an example embodiment of the present disclosure is provided with the above-described motor.

The above and other elements, features, steps, characteristics and advantages of the present disclosure will become more apparent from the following detailed description of the example embodiments with reference to the attached drawings.

DETAILED DESCRIPTION

Hereinafter, example embodiments of rotors, motors, and electric power steering devices according to the present disclosure is described with reference to the drawings. In the present specification, the term "axial direction" means a direction in which a rotational axis of a rotor extends, the term "radial direction" means a radial direction of a circle centered on the rotational axis of the rotor, and the term "circumferential direction" means a circumferential direction of a circle centered on the rotational axis of the rotor.

In addition, in this specification, the expression "extending in an axial direction" includes a state in which an object extends exactly in the axial direction and a state in which an object extends a direction inclined at less than 45 degrees with respect to the axial direction. Similarly, in this specification, the expression "extending in a radial direction" includes a state in which an object extends exactly in the radial direction and a state in which an object extends a direction inclined at less than 45 degrees with respect to the radial direction.

Figure 1:
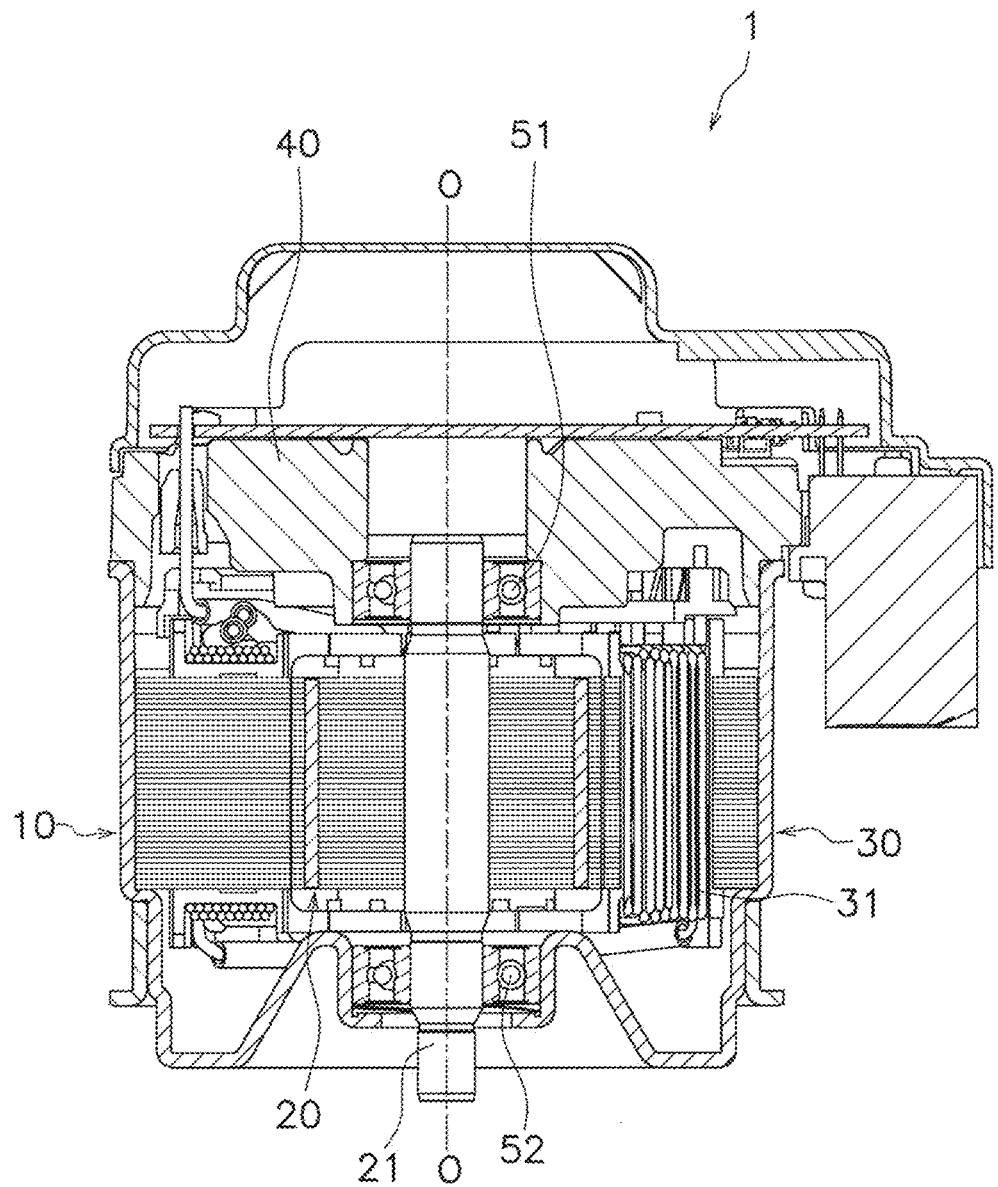
FIG. 1 is a cross-sectional view of a motor according to an example embodiment of the present disclosure.

As shown in FIG. 1, a motor 1 is of an inner rotor type. The motor 1 is provided with a housing 10, a rotor 20, a stator 30, and a bearing holder 40. The housing 10 has a bottomed cylindrical or substantially bottomed cylindrical shape. That is, the housing 10 has a bottom face. In addition, an upper face of the housing 10 is opened. The housing 10 houses the rotor 20 and the stator 30. The bearing holder 40 is fixed to the housing 10. The stator 30 has a plurality of coils 31. The stator 30 faces the rotor 20 in a radial direction.

Figure 2:
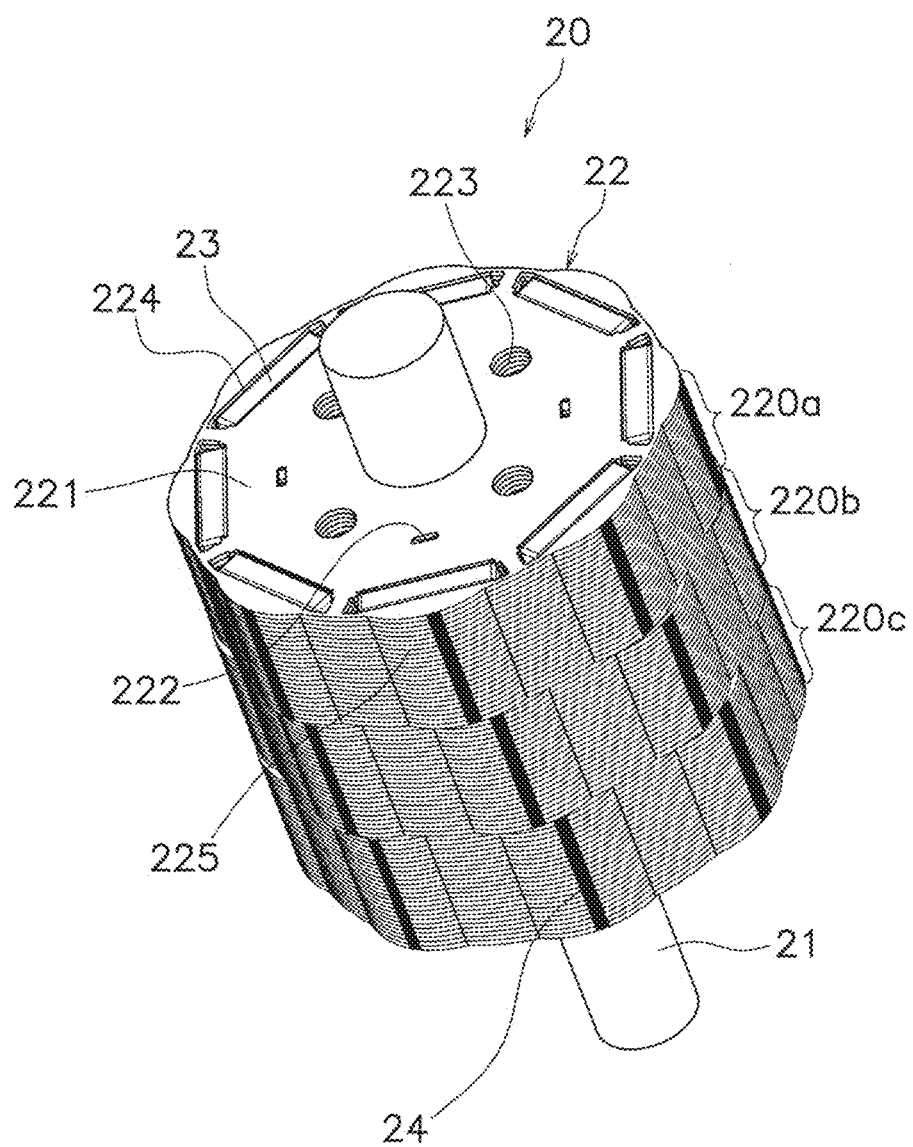
FIG. 2 is a perspective view of a rotor according to an example embodiment of the present disclosure.
Figure 3:
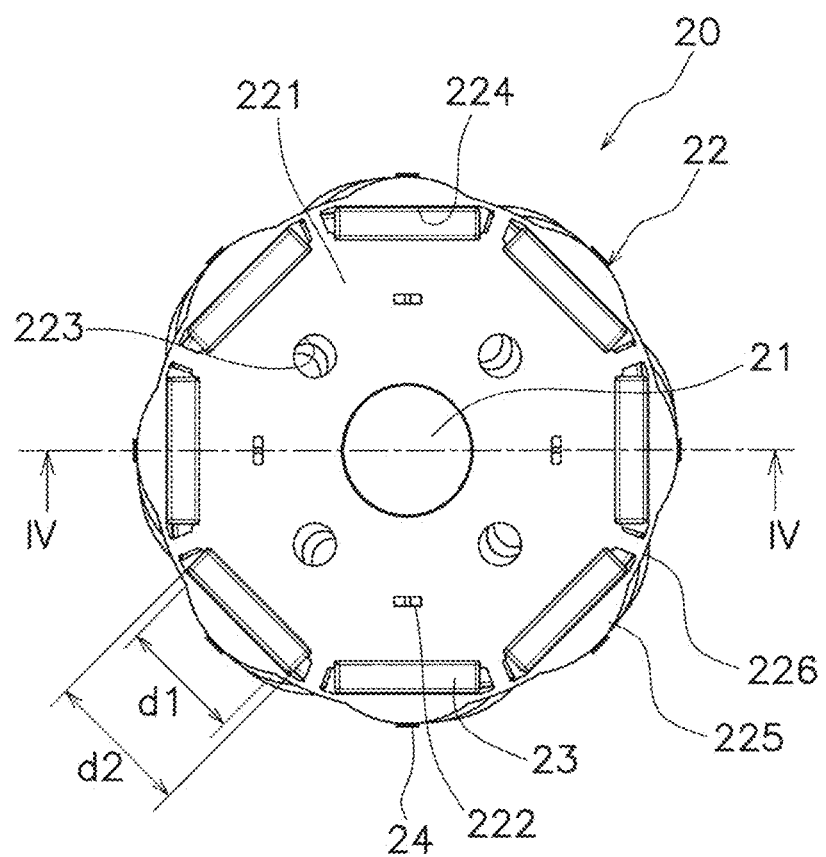
FIG. 3 is a plan view of the rotor according to an example embodiment of the present disclosure.
Figure 4:
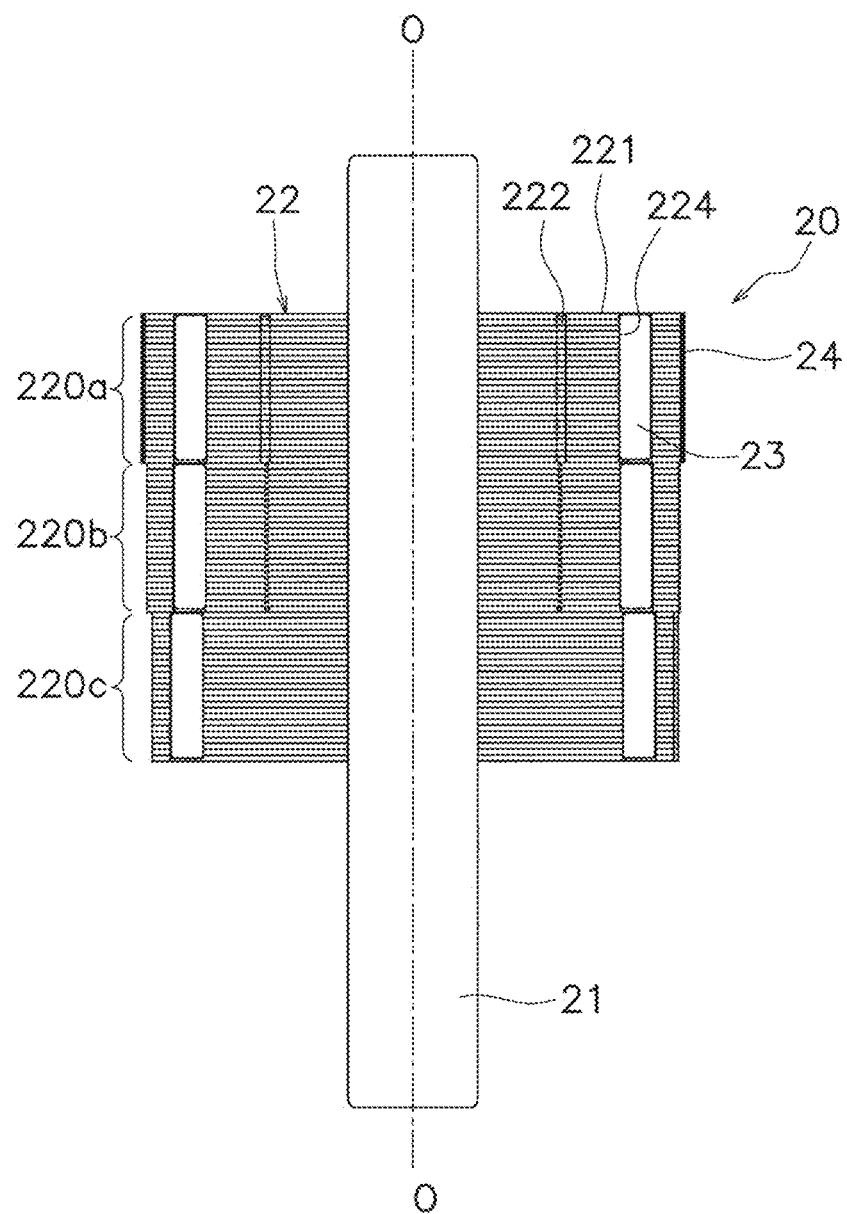
FIG. 4 is a cross-sectional view taken along line IV-IV in FIG. 3.

As shown in FIGS. 2 to 4, the rotor 20 is provided with a shaft 21, a rotor core 22, a plurality of magnets 23, and a plurality of fixing parts 24. The rotor 20 is rotated about a rotational axis 0.

The shaft 21 extends in an axial direction. The shaft 21 has a substantially cylindrical shape. As shown in FIG. 1, the shaft 21 is rotatably supported by a first bearing 51 and a second bearing 52.

The first bearing 51 is supported by the bearing holder 40. The second bearing 52 is held by the housing 10.

As shown in FIGS. 2 to 4, the rotor core 22 is fixed to the shaft 21. The rotor core 22 is rotated integrally with the shaft 21. The rotor core 22 has a plurality of laminations 221. The plurality of laminations 221 are stacked in the axial direction. Each of the laminations 221 has substantially the same shape. Each lamination 221 is, for example, an electric steel plate.

The plurality of laminations 221 constitute a plurality of lamination groups 220a to 220c. In addition, in this example embodiment of the present disclosure, the plurality of laminations 221 constitute the three lamination groups 220a to 220c. Specifically, the plurality of laminations 221 constitute the first lamination group 220a, the second lamination group 220b, and the third lamination group 220c. The lamination groups 220a to 220c are deviated from each other in a circumferential direction. That is, the plurality of laminations constitute the plurality of lamination groups, and the lamination groups are deviated from each other in the circumferential direction. That is, the rotor 20 has a skew structure.

The rotor core 22 has a plurality of caulking parts 222. Each caulking part 222 caulks the plurality of laminations 221 together. The caulking part 222 is disposed at a radial-directional inner side of the magnet 23. Each caulking part 222 is disposed at intervals in the circumferential direction. In addition, each caulking part 222 extends in the axial direction.

Each caulking part 222 is provided for each of the lamination groups 220a to 220c. That is, each caulking part 222 caulks the laminations 221 together for each of the lamination groups 220a to 220c. Each caulking part 222 does not caulk the laminations 221 belonging to the different lamination groups 220a to 220c. For this reason, the lamination groups 220a to 220c are not fixed to each other. Each of the lamination groups 220a to 220c is separately fixed to the shaft 21.

The rotor core 22 has a plurality of lightening holes 223. The lightening hole 223 penetrates the rotor core in the axial direction. The lightening hole 223 is provided for each of the lamination groups 220a to 220c. The lightening hole 223 provided in the first lamination group 220a, the lightening hole 223 provided in the second lamination group 220b, and the lightening hole 223 provided in the third lamination group 220c may not be in communication with each other. In addition, in this example embodiment of the present disclosure, the lightening hole 223 provided in the first lamination group 220a, the lightening hole 223 provided in the second lamination group 220b, and the lightening hole 223 provided in the third lamination group 220c are in communication with each other. That is, each of the lightening holes, which is provided in each of the plurality of lamination groups, is in communication with each other.

The number of lightening holes 223 is the same as the number of caulking parts 222. The lightening holes 223 and the caulking parts 222 are alternately disposed in the circumferential direction. The total number of the caulking parts 222 and the lightening holes 223 is the same as the number of magnets 23. That is, the number of each of the caulking parts 222 and the lightening holes 223 is half of the number of magnets 23. Any one of the caulking part 222 or the lightening hole 223 is disposed at a radial-directional inner side of each magnet 23.

The rotor core 22 is a so-called IPM (Interior Permanent Magnet) type rotor. A plurality of magnets 23 are embedded in the rotor core 22. The rotor core 22 has a plurality of accommodation holes 224 for accommodating the magnet 23 therein. Each accommodation hole 224 extends in the axial direction. Each of the accommodation holes 224 is disposed with each other at intervals in the circumferential direction. Each accommodation hole 224 is provided for each of the lamination groups 220a to 220c.

Each accommodation hole 224 accommodates the magnet 23 and also functions as a flux barrier. That is, both circumferential-directional ends of each accommodation hole 224 are voids where the magnet 23 is not existed. Both ends of each accommodation hole 224 function as the flux barrier.

The accommodation hole 224 provided in the first lamination group 220a, the accommodation hole 224 provided in the second lamination group 220b, and the accommodation hole 224 provided in the third lamination group 220c may not be in communication with each other. In addition, in this example embodiment of present disclosure, the accommodation hole 224 provided in the first lamination group 220a, the accommodation hole 224 provided in the second lamination group 220b, and the accommodation hole 224 provided in the third lamination group 220c are in communication with each other. Circumferential positions of the accommodation hole 224 provided in the first lamination group 220a, the accommodation hole 224 provided in the second lamination group 220b, and the accommodation holes 224 provided in the third lamination group 220c differ from each other.

The rotor core 22 has a plurality of convexities 225. Specifically, an outer circumferential surface of the rotor core 22 has a plurality of base 226 and a plurality of convexities 225. Each base 226 and each convexity 225 are disposed alternately in the circumferential direction. Each base 226 is a part of a circle centered on the rotational axis 0 when viewed in the axial direction.

Each convexity 225 protrudes outward from the base 226 in the radial direction. When viewed in a plan view, an outer edge of each convexity 225 has an arc or substantially arc shape. A radius of curvature of each convexity 225 is smaller than a radius of curvature of each base 226. A circumferential length d1 of each convexity 225 is smaller than a circumferential length d2 of each magnet 23. Specifically, the circumferential length d1 of the convexity 225 indicates a distance of a straight line connecting intersections of the base 226 and the convexity 225. The number of convexities 225 is the same as the number of magnetic poles. In addition, in this example embodiment of the present disclosure, the number of magnetic poles is the same as the number of accommodation holes 224. Each convexity 225 is disposed at a radial-directional outer side of each accommodation hole 224.

Each convexity 225 is provided for each of the lamination groups 220a to 220c. Circumferential positions of the convexity 225 provided on the first lamination group 220a, the convexity 225 provided on the second lamination group 220b, and the convexity 225 provided on the third lamination group 220c differ from each other. That is, the circumferential positions of each of the convexities, which is provided in each of the plurality of lamination groups, is different from each other. For this reason, vertices of the convexities 225 have different circumferential positions for the lamination groups 220a to 220c. In addition, the vertex of each convexity 225 is disposed at the radial-directional outermost side of each convexity 225.

Each magnet 23 is embedded in the rotor core 22. Specifically, each magnet 23 is accommodated in each accommodation hole 224. Each magnet 23 is fixed in each accommodation hole 224. For example, each magnet 23 is press-fitted into each accommodation hole 224. The number of magnets 23 is the same as the number of convexities 225. In addition, the magnet 23 may be sealed in the accommodation hole 224 by an adhesive or a resin. In this example embodiment of the present disclosure, the number of magnets 23 is the same as the number of magnetic poles. Furthermore, magnetic flux of the magnet 23 extends in the radial direction.

Each magnet 23 is embedded for each of the lamination groups 220a to 220c. For this reason, each magnet 23 does not extend over the different lamination groups 220a to 220c.

Each fixing part 24 fixes at least parts of outer peripheral edges of the plurality of laminations 221 to each other. The fixing part 24 is a welded part at which the outer peripheral edges of the laminations 221 are welded to each other. For example, the outer peripheral edges of the laminations 221 are welded to each other by laser welding or the like. By forming the fixing part 24 by laser welding, a radial thickness of the fixing part 24 can be reduced. As a result, it is possible to prevent the fixing part 24 from interfering with the stator 30.

The fixing part 24 is provided for each of the lamination groups 220*a* to 220*c*. In addition, the plurality of fixing parts 24 are provided for each of the lamination groups 220*a* to 220*c*. The fixing part 24 does not fix the laminations belonging to the different lamination groups 220*a* to 220*c*.

The fixing part 24 is disposed at a vertex of the convexity 225. The caulking part 222, the magnet 23, and the fixing part 24 are linearly arranged in the radial direction. Similarly, the lightening hole 223, the magnet 23, and the fixing part 24 are linearly arranged in the radial direction. The fixing part 24 extends in the axial direction. The fixing part 24 extends substantially the same distance as the caulking part 222 in the axial direction. The number of fixing parts 24 is the same as the number of convexities 225. That is, the number of the magnets 23 and the fixing parts 24 are the same as the number of the convexities 225.

As described above, since the fixing part 24 fixes the outer peripheral edges of the laminations 221 to each other, natural frequency of each lamination 221 becomes high. As a result, resonance of each lamination 221 during rotation of the rotor 20 can be suppressed to prevent an outer circumferential end of each lamination 221 from being opened.

The fixing part 24 can also prevent the outer circumferential end of each lamination 221 from being opened by vibration of the magnet 23. Specifically, since an attractive force and a repulsive force are applied to each magnet 23 by the influence of a magnetic force of the stator 30, each magnet 23 is vibrated in the radial direction. Due to vibration of the magnet 23, there is a concern that the outer circumferential end of each lamination 221 is opened. On the contrary, in the motor 1 according to this example embodiment of the present disclosure, since the fixing part 24 fixes the outer peripheral edges of the laminations 221 to each other, it is possible to prevent the outer circumferential end of each lamination 221 from being opened.

Since the fixing part 24 is disposed at the vertex of the convexity 225, the vibration pattern of the lamination 221 can be separately examined for each convexity 225. Due to this configuration, it is possible to easily control vibration of the lamination 221.

An example in which the motor 1 configured as described above is mounted on an electric power steering device is described.

Figure 5:
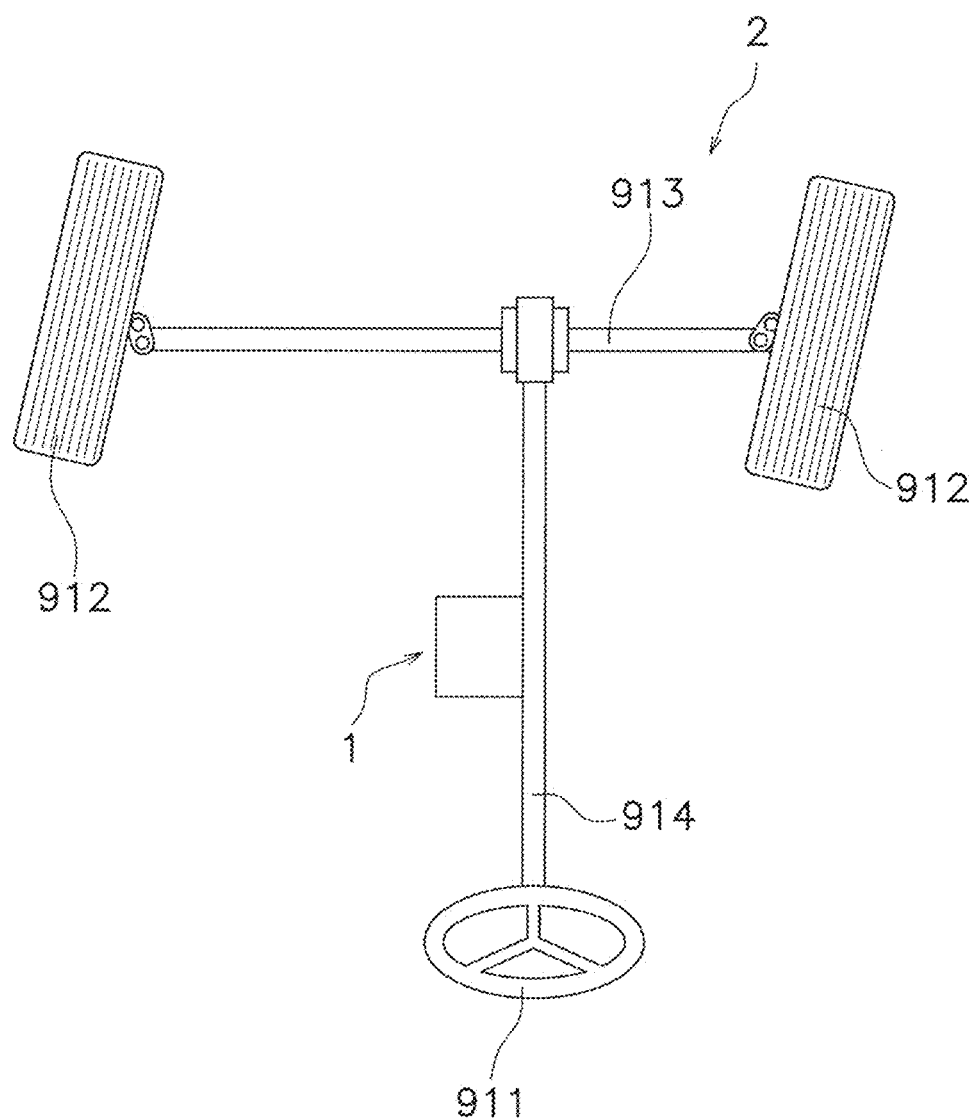
FIG. 5 is a schematic view showing an electric power steering device according to an example embodiment of the present disclosure.

As shown in FIG. 5, an electric power steering device 2 is mounted on a steering mechanism of a vehicle wheel of a vehicle. The electric power steering device 2 is a column-type power steering device that directly reduces a steering force by power of the motor 1. The electric power steering device 2 is provided with the motor 1, a steering shaft 914, and an axle 913.

The steering shaft 914 transmits an input from a steering wheel 911 to the axle 913 having the vehicle wheels 912. Power of the motor 1 is transmitted to the axle 913 via a ball screw. The motor 1 employed in the column-type electric power steering device 2 is provided inside an engine room (not shown).

Although the electric power steering device 2 has been described as one example of the usage method of the motor 1, the usage method of the motor 1 is not limited, and the motor 1 may be used in a wide range such as a pump, a compressor, or the like.

Although the example embodiment of the present disclosure has been described above, the present disclosure is not limited to these, and various modifications may be made without departing from the spirit of the present disclosure.

In the example embodiment of the present disclosure, each of the lamination groups 220*a* to 220*c* is deviated with each other in the circumferential direction, but each of the lamination groups 220*a* to 220*c* may not be deviated with each other in the circumferential direction.

In the example embodiment of the present disclosure, the plurality of laminations 221 constitute the plurality of lamination groups 220*a* to 220*c*, but the plurality of laminations 221 may constitute only one lamination group.

In the example embodiment of the present disclosure, the number of caulking parts 222 is half of the number of magnets 23, but the number of caulking parts 222 is not limited to the above limitation. For example, the numbers of caulking part 222, magnet 23, and fixing part 24 may be the same. In this case, the caulking part 222 is disposed at a radial-directional inner side of each magnet 23.

In the example embodiment of the present disclosure, the fixing part 24 has been described as a welded part, but the fixing part is not limited thereto. For example, the fixing part 24 may fix the outer peripheral edges of the laminations 221 to each other with an adhesive or a heat-shrinkable tube.

In the example embodiment of the present disclosure, the outer circumferential surface of the rotor core 22 has the base 226 and the convexity 225, but the outer circumferential surface of the rotor core 22 may not have the base 226. That is, each convexity 225 may be in contact with each adjacent convexity 225.

In the example embodiment of the present disclosure, the rotor core 22 has the plurality of convexities 225, but may not have the convexity 225. In this case, the outer periphery of the rotor core 22 has a circular substantially circular shape.

In the example embodiment of the present disclosure, the rotor 20 is an inner rotor, but may be an outer rotor.

In the example embodiment of the present disclosure, although the number of magnets 23 and the number of magnetic poles are the same, the number of magnets 23 and the number of magnetic poles may differ from each other. For example, the pair of magnets 23 may constitute one magnetic pole, and the rotor 20 may further have a commutating pole. When the pair of magnets 23 constitute one magnetic pole, the pair of magnets 23 are arranged in the circumferential direction. In addition, the pair of magnets 23 are disposed to be opened outward in the radial direction.

In the example embodiment of the present disclosure, the shaft 21 of the rotor 20 is supported by the first bearing 51 and the second bearing 52, but may be supported only by the second bearing 52. That is, only a lower end of the shaft 21 may be supported, and an upper end of the shaft 21 may not be supported.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A rotor comprising:
a shaft extending in an axial direction;
a rotor core including a plurality of laminations stacked in the axial direction, and at least one caulking portion disposed at a radial-directional inner side of at least one magnet to caulk the plurality of laminations to each other;

the at least one magnet embedded in the rotor core; and at least one fixing portion fixing at least portions of outer peripheral edges of the plurality of laminations to each other; wherein the at least one caulking portion, the at least one magnet, and the at least one fixing portion are linearly arranged in a direction.

2. The rotor of claim 1, wherein the at least one fixing portion is a welded portion at which outer peripheral edges of the laminations are welded to each other.

3. The rotor of claim 1, wherein the plurality of laminations define at least one lamination group, and the at least one caulking portion and the at least one fixing portion are provided for each lamination group.

4. The rotor of claim 3, wherein the at least one lamination group defines a plurality of lamination groups, and the plurality of lamination groups are deviated from each other in a circumferential direction.

5. The rotor of claim 1, wherein the rotor core includes a plurality of convexities protruding outward in the radial direction and disposed in the circumferential direction, a number of the at least one magnet and a number of the at least one fixing portion are the same as a number of the plurality of convexities, and the at least one fixing portion is disposed at a vertex of one of the plurality of convexities.

6. The rotor of claim 5, wherein the at least one lamination group defines a plurality of lamination groups and circumferential positions of each of the plurality of convexities in each of the plurality of lamination groups, are different from each other.

7. The rotor of claim 1, wherein the rotor core includes a plurality of lightening holes penetrating the rotor core in the axial direction, a number of the at least one caulking portion is the same as a number of the plurality of lightening holes, and the plurality of lightening holes and the at least one caulking portion are alternately disposed in the circumferential direction.

8. The rotor of claim 7, wherein each of the plurality of lightening holes in each of the plurality of lamination groups are in communication with each other.

9. The rotor of claim 1, wherein a number of the at least one magnet, a number of the at least one caulking portion, and a number of the at least one fixing portion are the same.

10. A motor comprising:
the rotor of claim 1; and
a stator facing the rotor in a radial direction and including a plurality of coils.

11. An electrical power steering device comprising the motor of claim 10, a steering shaft, and an axle.

* * * * *